UNITED STATES PATENT OFFICE.

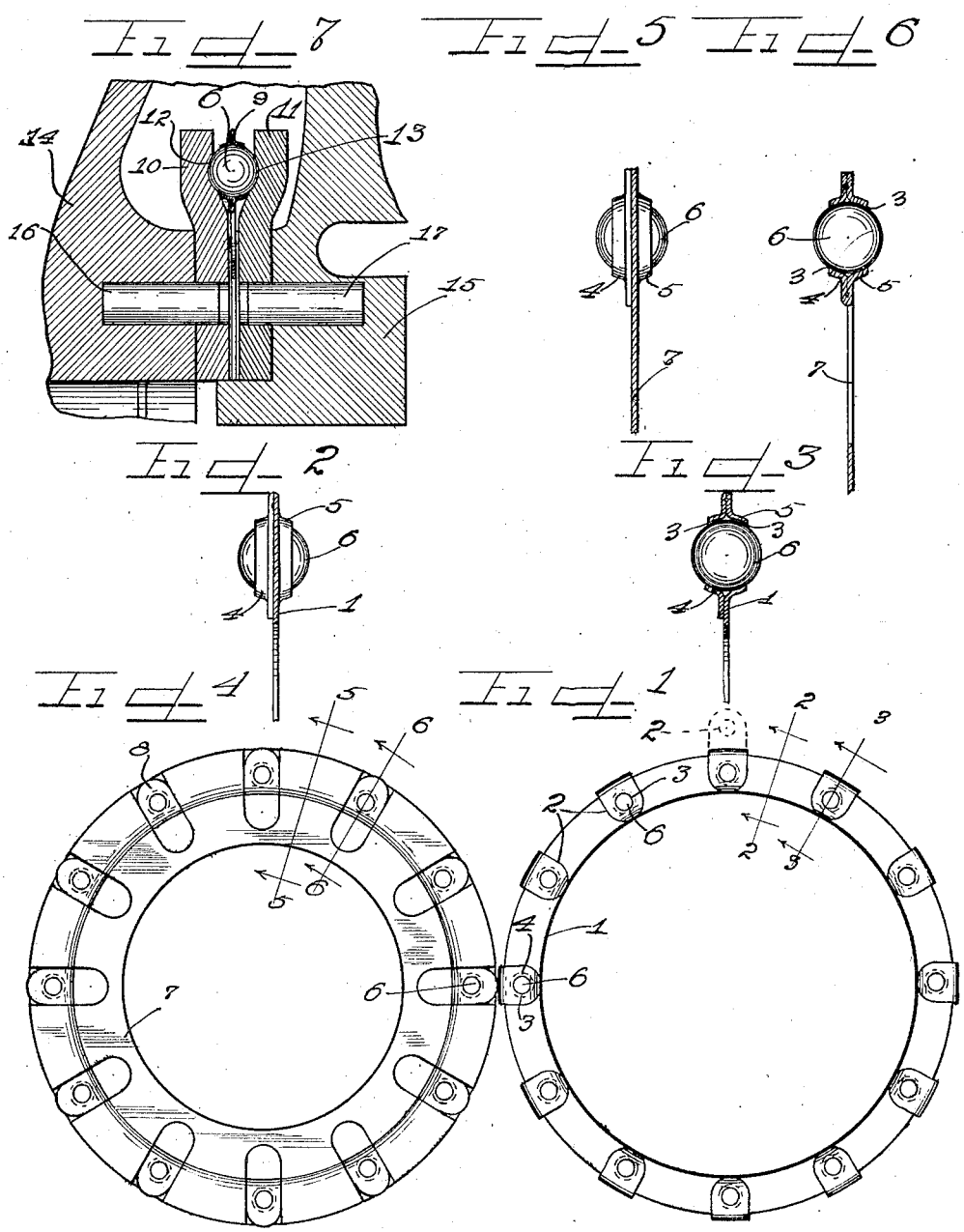

GEORGE D. BAILEY, OF CHICAGO, ILLINOIS, ASSIGNOR TO GEO. D. BAILEY CO., A CORPORATION OF ILLINOIS.

BALL-RETAINER.

1,332,282.     Specification of Letters Patent.     Patented Mar. 2, 1920.

Application filed March 18, 1918. Serial No. 223,119.

*To all whom it may concern:*

Be it known that I, GEORGE D. BAILEY, a citizen of the United States, and a resident of the city of Chicago, in the county of Cook and State of Illinois, have invented certain new and useful Improvements in Ball-Retainers; and I do hereby declare that the following is a full, clear, and exact description of the same, reference being had to the accompanying drawings, and to the numerals of reference marked thereon, which form a part of this specification.

This invention has reference more particularly to a retainer for ball bearings which is made from a single piece of stock and has integral ears or flaps that may be folded to retain the balls in place.

The object of the invention is to provide a retainer for ball bearings which is of simple form, of light weight, and which on account of the small amount of material required and the ease of manufacture can be made at a small cost.

Another object of the invention is to provide a retainer for ball bearings having an integral flap for each ball, which is suitably arranged with reference to the body of the retainer, so that it may be easily folded to hold the ball.

Another object of the invention is to provide a retainer for ball bearings having retaining ears or flaps of regular and even formation that may be made with simple dies and easily cut from the stock.

Another object of the invention is to provide a retainer for ball bearings with integral flaps folded against the body of the retainer to hold the balls and having the fold so arranged that the fold of the metal is sufficiently strong to retain the ball in place without further provision.

Another object of the invention is to provide a retainer for ball bearings which is compact in form and requires a minimum amount of space between the bearing plates with which the balls of the retainers are engaged.

This invention also has other features of improvement which will appear from the following specification and drawings.

My invention (in a preferred form) is shown in the accompanying drawings and described in the following specification.

On the drawings:

Figure 1 in a side view of an end thrust ball retainer embodying my improvements.

Fig. 2 is an enlarged sectional view on the line 2—2 of Fig. 1.

Fig. 3 is an enlarged sectional view on the line 3—3 of Fig. 1.

Fig. 4 is a side view of a modified form of end thrust bearing retainer.

Fig. 5 is a sectional view on the line 5—5 of Fig. 4.

Fig. 6 is an enlarged sectional view on the line 6—6 of Fig. 4.

Fig. 7 is an axial fragmentary sectional view of parts assembled in connection with my ball retainer.

As shown on the drawings:

The reference numeral 1, indicates a ring of sheet metal which is stamped with the ears 2, extending radially from the periphery of the ring and suitably spaced thereabout to provide for the required number of balls. Each of the ears 2, and the ring 1, immediately adjacent thereto are stamped or otherwise provided with matching perforations 3, having the metal around the opening countersunk spherically or otherwise constructed to engage the surface of a ball so that when the flaps 2, are folded over against the ring 1, the flaps 2, and the ring 1, will have oppositely extending perforated concave portions 4 and 5, respectively between which the ball is held and free to rotate and prevented from removal owing to the fact that the diameter of the opening 3, in the metal is less than the diameter of the ball held therein. The countersunk portions 4 and 5, project from the surface of the metal from which they are stamped a distance less than the radius of the ball 6, so that the balls 6, project through the openings 3, and are thereby adapted to engage a bearing plate at each side of the ball retainer.

The corresponding openings 3, in the flaps 2, and the ring 1, are centered on a radial line, and suitably spaced around the periphery of the ring 1, so that when the flap 2, is folded on a line tangentially to the periphery of the ring 1, the opening 3, in the flap 2, and the corresponding opening in the ring 1, will register with one another.

In Figs. 4, 5 and 6, I have shown a modified form of a retainer for ball bearings, in which the ring 7, is wider than is necessary in the construction shown in the preceding figures, and has the flaps 8, which are otherwise similar to the flaps 2, in said preceding figures, stamped from the body of the ring and folded outwardly and provided with openings 3, to register with matching openings around the outer part of the ring. This construction requires a blank of stock smaller in diameter than shown in Figs. 1, 2 and 3, and may be used where the internal diameter of the ring does not need to be restricted.

In Fig. 7, in which I have shown a ball retainer assembled for operation, numeral 9, indicates the retainer which may be of either construction described, to hold the balls 6, in proper position to be engaged by the bearing plates 10 and 11, one on each side thereof, which have the ball grooves 12 and 13, within which the balls 6, operate. The reference numerals 14 and 15, indicate fragmentary portions of two members adapted for relative rotation, the frictional engagement of which is minimized by the ball bearings, the bearing plates 10, and 11, being connected to rotate with the members 14 and 15, respectively, by means of the pins 16 and 17, respectively.

It will be noted that with the construction which I have provided, the space occupied by the retainer intermediate of the plates 10 and 11, is reduced to a minimum and permits a more compact arrangement of the parts than is usually possible with other forms of ball retainers.

While I have shown my invention embodied in certain forms, many changes and modifications may be made without departing from the principle of my invention and I do not desire to limit this application for patent otherwise than necessitated by the prior art.

I claim as my invention:

1. In a device of the class described the combination of a member, having a plurality of circularly arranged folded flaps and matching perforations in each flap and the adjoining portion of the circular member, and balls held to the member by means of the flaps and having opposite portions thereof projecting through the matching perforations in the flap and member.

2. A device of the class described comprising a flat circular member having radially arranged flaps folded against the circular member to retain bearing balls therebetween.

3. A device of the class described comprising a flat circular member provided with integral radially arranged flaps adapted to be folded against the said member to retain bearing balls therebetween, the said flap and the member being provided with matching perforations through which oppposite portions of the balls are adapted to project.

4. In a device of the class described the combination of a flat circular ring having a plurality of spaced perforations adjacent the outer edge thereof and a plurality of ears cut from the ring intermediate of the inner and outer edges thereof each adapted to be folded over a perforation in the said member, the said ears being provided with perforations registering with the perforations of the ring, and balls interposed between the ears and the member and projecting through the openings thereof.

5. A device of the class described comprising a ball support having a plurality of circularly arranged perforations and a ball projecting through each perforation, a clamp adjacent each perforation, integral with the ball support and suitably folded to hold the ball in the perforation.

6. In a device of the class described the combination of a circular ring having a plurality of flaps cut therefrom intermediate of the inner and outer edges thereof and folded over adjoining portions of the ring, matching perforations in each flap and the adjoining portion of the ring, and a ball intermediate of each flap and ring and having opposite portions thereof projecting through the said matching perforations.

7. In a device of the class described the combination of a ball holder having a plurality of flaps integral therewith, each flap having a fold extending transversely thereof intermediate of the ball holder and flap and adapted to hold the flap in its folded position, said holder having matching perforations in each flap and the adjoining portion of the ball holder, and a ball intermediate of each flap and adjoining portion of the ball holder, said balls having opposite portions thereof projecting through the said perforations.

In testimony whereof I have hereunto subscribed my name in the presence of two subscribing witnesses.

GEORGE D. BAILEY.

Witnesses:
FRANK A. BREME, Jr.,
CHARLES W. HILLS, Jr.